Aug. 6, 1968  D. J. CRIMMINS  3,396,230

LAMINATED BUS ASSEMBLIES

Filed July 6, 1966  3 Sheets-Sheet 1

INVENTOR.
DAVID J. CRIMMINS
BY
Kenyon & Kenyon
ATTORNEYS.

Aug. 6, 1968  D. J. CRIMMINS  3,396,230
LAMINATED BUS ASSEMBLIES
Filed July 6, 1966  3 Sheets-Sheet 2
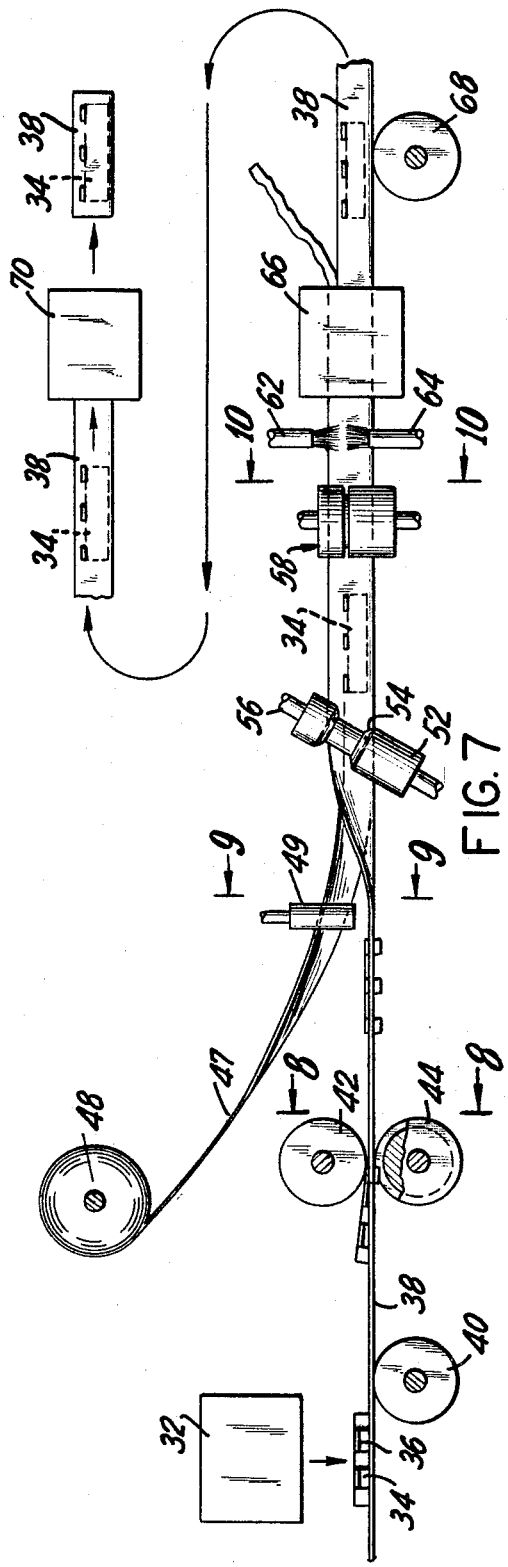
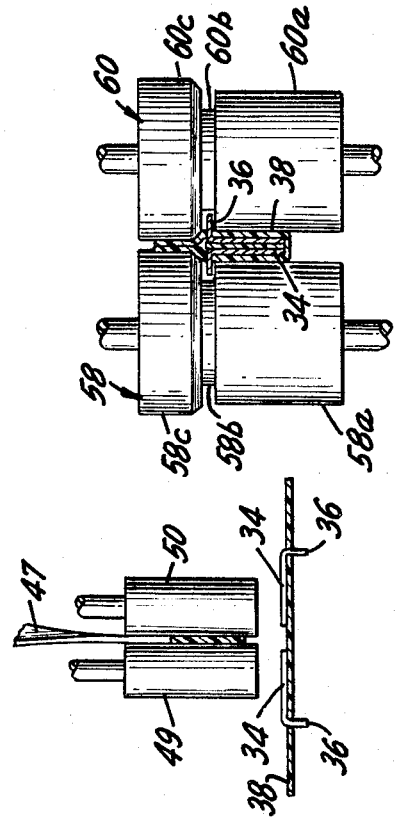
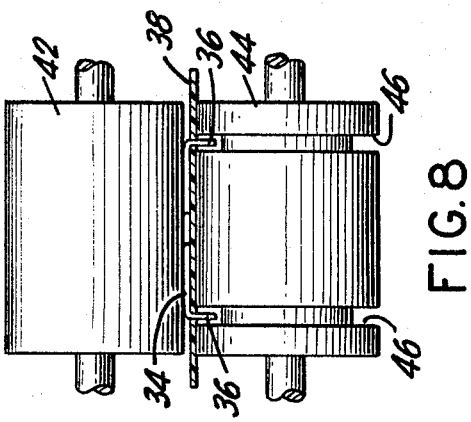
INVENTOR.
DAVID J. CRIMMINS
BY
*Kenyon & Kenyon*
ATTORNEYS.

Aug. 6, 1968  D. J. CRIMMINS  3,396,230
LAMINATED BUS ASSEMBLIES
Filed July 6, 1966  3 Sheets-Sheet 3
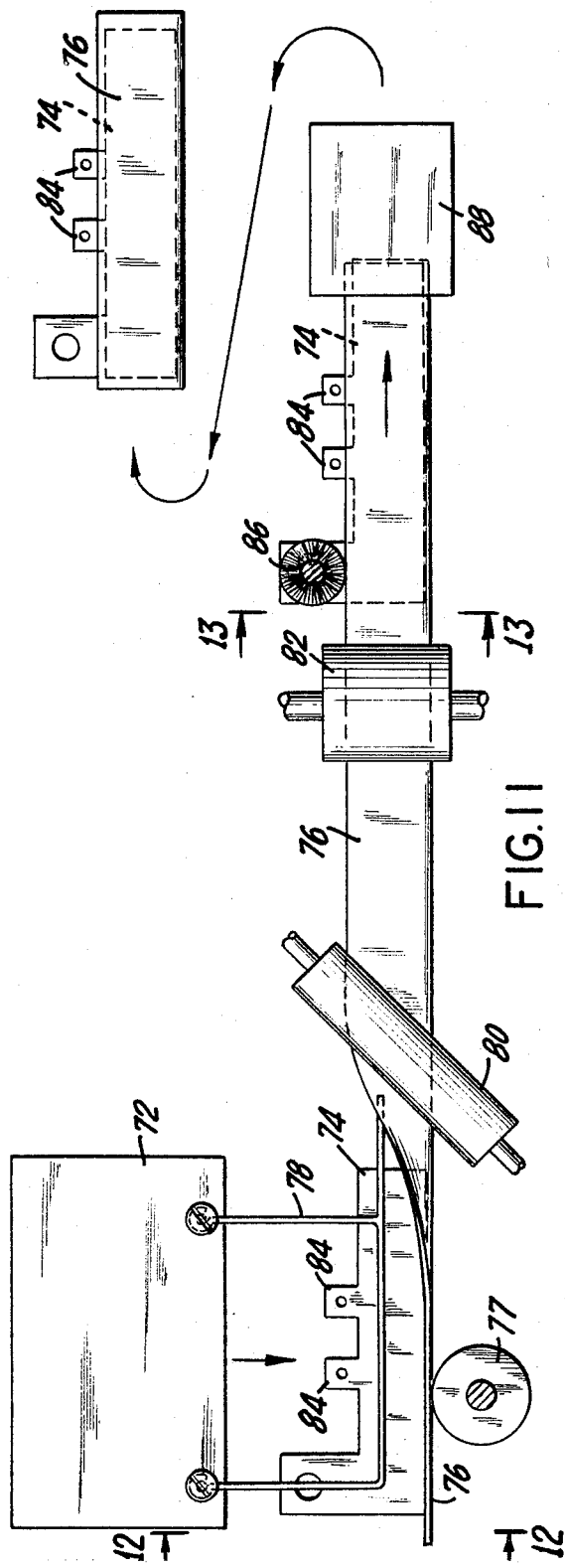
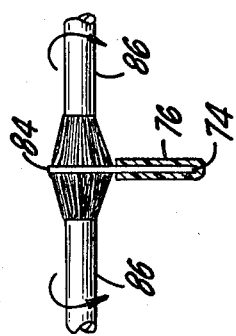
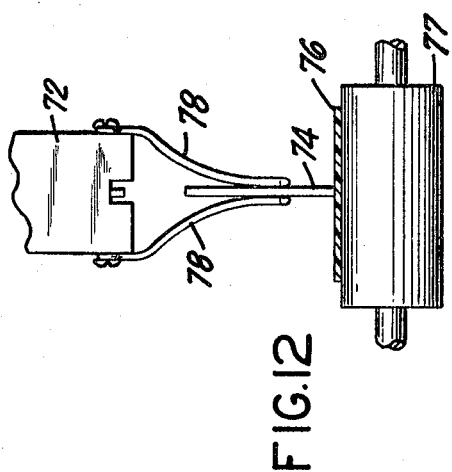
INVENTOR.
DAVID J. CRIMMINS
BY
Kenyon & Kenyon
ATTORNEYS.

United States Patent Office 3,396,230
Patented Aug. 6, 1968

3,396,230
LAMINATED BUS ASSEMBLIES
David J. Crimmins, Pennington, N.J., assignor to The Thomas & Betts Co., Elizabeth, N.J., a corporation of New Jersey
Filed July 6, 1966, Ser. No. 563,128
8 Claims. (Cl. 174—72)

ABSTRACT OF THE DISCLOSURE

A laminated bus assembly in which there is a seam along only one longitudinal edge of the assembly. The laminated bus assembly comprises at least one conducting plate and a sheet of insulating material folded about said plate, and sealed at its joined edges to form a single bonded seam along only one longitudinal edge of the plate. Preferably, the conducting plate has at least one tab protruding externally of said insulating material.

---

This invention relates to improvements in laminated bus assemblies and more particularly relates to a new and improved laminated bus assembly that is simple and efficient to manufacture and that has improved electrical characteristics.

In many electrical applications, buses or bus assemblies are used to distribute power throughout the electrical system. Where a plurality of buses in close proximity to each other are used in a bus assembly, it is desirable that the assembly be insulated in such a manner that there be controlled capacitance along the length of the assembly and that the assembly be highly resistant to short circuiting due to leakage of moisture, etc. It is also desirable that the bus assembly occupy as little space as possible and be mechanically strong.

Formerly, insulation of bus assemblies has been accomplished by providing a laminate of alternating layers of sheets of insulating material and buses which are sealed along the two longitudinal edges of the laminate. Although this former technique of insulation provides controlled capacitance between adjacent buses, it has been found that the insulation of such assemblies is often likely to delaminate along the two sealed longitudinal edges of the assembly due to the effects of temperature and humidity changes. This delamination of the insulation is undesirable, since it increases the likelihood of short circuiting due to contamination and moisture leakage.

According to the present invention, these disadvantages are overcome by providing a laminated bus assembly in which there is a seam along only one longitudinal edge of the assembly. In one embodiment of the bus assembly of the present invention, a pair of spaced buses separated by a layer of insulating material is covered with a U-shaped strip of insulating material bonded to the buses and sealed along the joined edges of the strip to form a seam along only one longitudinal edge of the assembly. Such a bus assembly greatly reduces the likelihood of delamination of the insulation and greatly increases the resistance to short circuiting and other electrical characteristics of the assembly. Increased mechanical strength is also provided, as well as reduction in overall size of the assembly.

In another embodiment of the bus assembly of the present invention, a bus assembly is provided in which each bus of a plurality of buses is individually insulated by a U-shaped strip of insulating material sealed along the joined edges of the strip to form a seam along only one longitudinal edge of the bus, all of the seams of the plurality of insulated buses being placed along the same longitudinal edge of the assembly, and the entire assembly being insulated by an outer U-shaped sheet of insulation bonded to the assembly which covers the plurality of seamed edges of the individually insulated buses.

It is thus an object of the present invention to provide a new and improved laminated bus assembly which is simple and economical to manufacture.

It is a further object of the present invention to provide a new and improved laminated bus assembly which is highly resistant to delaminaation and which has greatly improved electrical characteristics.

It is still another object of the present invention to provide a new and improved laminated bus assembly which is mechanically strong and which occupies a minimum of space.

These and other objects will be readily apparent to those skilled in the art from the following description and drawings in which:

FIG. 7 is a schematic view of one apparatus for laminating the embodiment of the present invention shown in FIG. 1;

FIG. 8 is a partially sectional elevational view taken along line 8—8 of FIG. 7;

FIG. 9 is a partially sectional elevational view taken along line 9—9 of FIG. 7;

FIG. 10 is a sectional elevational view taken along line 10—10 of FIG. 7;

FIG. 11 is a schematic view of one apparatus for making another embodiment of the present invention;

FIG. 12 is a sectional elevational view taken along line 12—12 of FIG. 11; and

FIG. 13 is a sectional elevational view taken along line 13—13 of FIG. 11.

Figure 1:
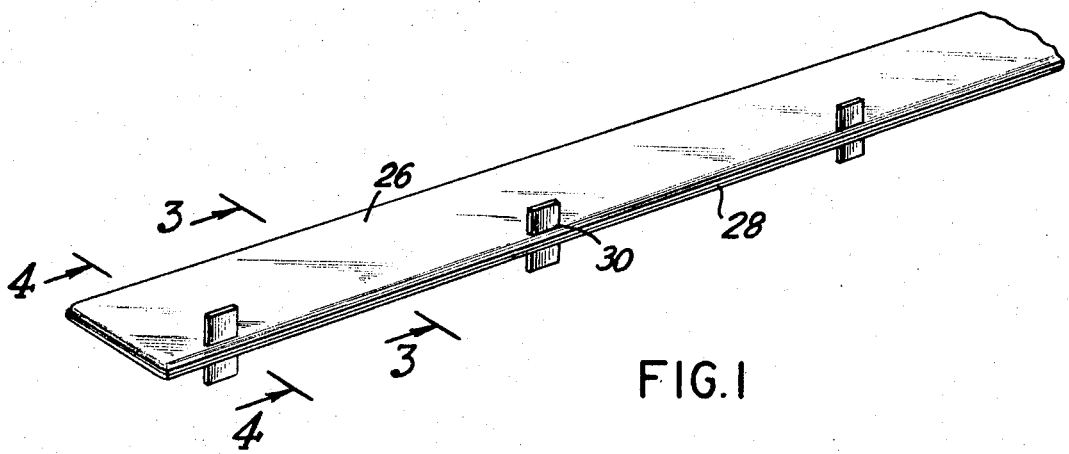
FIG. 1 is a perspective view of one embodiment of the present invention.
Figure 2:
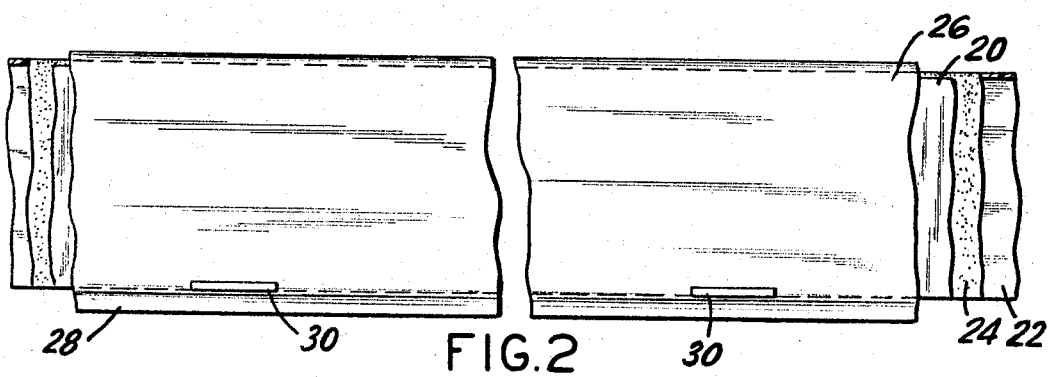
FIG. 2 is a partially sectional plan view of the embodiment of FIG. 1.
Figure 3:
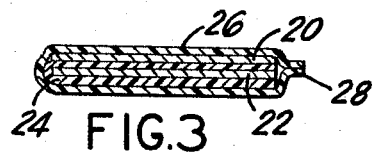
FIG. 3 is a sectional elevational view taken along line 3—3 of FIG. 1.
Figure 4:
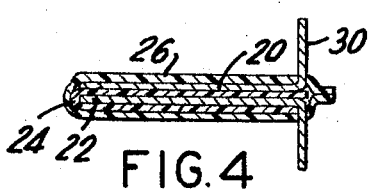
FIG. 4 is a sectional elevational view taken along line 4—4 of FIG. 1.

Referring now to the drawings and more specifically to FIGS. 1–4, there is shown one embodiment of the present invention comprising a laminated bus assembly having a first conducting plate 20 and a second conducting plate 22. Sandwiched between conducting plates 20 and 22 is an insulating sheet 24 which is also wrapped around lower plate 22. The longitudinal and lateral dimensions of sheet 24 are such that sheet 24 ovehangs the edges of plates 20 and 22. This provides an increased length leakage path between plates 20 and 22 for greater resistance to short circuiting. A sheet of insulating material 26 is wrapped around plates 20 and 22 and sheet 24 and sealed at its joined edges along one longitudinal edge of the assembly such as at 28. Insulating sheet 26 is bonded to plates 20 and 22 and sheet 24 by a suitable adhesive or the like. For best results, plates 20 and 22 should also be bonded to insulating sheet 24 by means of suitable adhesive or the like, although such bonding is not essential. Sheet 24 may be any suitable insulating material such as plastic, mica or the like. Conducting plates 20 and 22 may be any suitable conducting material such as copper, aluminum or the like. Insulating sheet 24 may be any suitable insulating material such as plastic, rubber or the like. Conducting plates 20 and 22 are provided with transversely extending, oppositely disposed tabs 30 which penetrate through insulating sheet 26. Tabs 30 are provided for the connection of suitable terminal contacts or other components by welding, soldering or the like.

Figure 5:
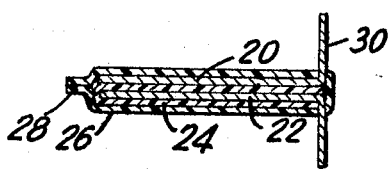
FIG. 5 is a sectional elevational view of another embodiment of the present invention.

As shown in FIGS. 1–4, seam 28 is provided along the longitudinal edge of the laminated bus assembly nearest tabs 30. It is also possible, as shown in FIG. 5, to provide seam 28 along the longitudinal edge furthest from the tabs 30, or along any other point about the periphery of the assembly.

Referring now to FIGS. 7–10, there is shown schematically one apparatus for making the laminated bus assembly of FIGS. 1–4. As shown in FIG. 7, such an apparatus may comprise a feed device 32, which may be any suitable magazine or the like, for feeding pairs of conducting plates simultaneously onto a sheet of insulating material. Feed device 32 may be operated either manually or automatically. As shown, a pair of plates 34 having oppositely disposed tabs 36 are simultaneously fed onto a sheet of insulating material 38. As shown in FIG. 7, sheet 38 is caused to move in a direction from left to right and passes over idler roll 40. Tabs 36 of plates 34 are caused to penetrate insulation sheet 38 by means of rolls 42 and 44, which may be of any suitable construction. As shown in FIG. 8, upper roll 42 is cylindrical in shape, having a smooth surface, and lower roll 44 is cylindrical in shape having a pair of circumferential grooves 46 having a depth greater than the penetration of tabs 36 of plates 34 beyond insulating sheet 38. Grooves 46 are provided so that tabs 36 may pass freely between rolls 42 and 44. Rolls 42 and 44 may be eliminated by providing feed device 32 with suitable means to cause tabs 36 of plates 34 to penetrate insulating sheet 38.

A sheet of insulating material 47 is provided wound up on a reel 48 having its longitudinal axis in a horizontal plane. Rolls 49 and 50 cause insulating material 47 to be turned 90° for insertion between plates 34 and are positioned so as to center material 47 between plates 34.

As shown in FIG. 7, a pair of rolls 52, one of which is not shown, cause insulating sheet 38 with plates 34 carried thereby to be folded up from a flat horizontal position to a U-shaped vertical position in which sheet 47 is centered between plates 34 and between the sides of folded insulation sheet 38. Rolls 52 are provided with a circumferential channel 54 adapted to allow free passage of tabs 36 of plates 34. Rolls 52 are mounted on obliquely positioned shafts 56. By positioning rolls 52 obliquely with respect to horizontally positioned insulating sheet 38, sheet 38 may be folded by gradual transition from the horizontal to the vertical.

In order to assure proper bonding of plates 34 to insulation 38 and, where applicable, bonding of insulation 47 to plates 34, suitable bonding material such as adhesive should be applied to the upper surface of insulation 38 and to both surfaces of insulation 47 prior to assembly of the laminate.

After rolls 52 have caused sheet 38 to be folded about plates 34 and sheet 47, a pair of vertically disposed rolls 58 cause the bonding of insulating sheet 38 to plates 34 and the bonding of the edges of sheet 38 to one another by the application of pressure and of heat where necessary. Where the bonding material is pressure sensitive, only pressure need be applied to bond the laminate. Where heat-activated bonding material is used, one or both of rolls 58 and 60 should be heated to accomplish bonding. Ultrasonic techniques or the like may also be used for bonding. The configuration of rolls 58 and 60 is shown more clearly in FIG. 10. As shown, roll 58 is provided with a lower portion 58a, an intermediate portion 58b, and an upper portion 58c. Roll 60 is also provided with lower, intermediate and upper portions respectively designated as 60a, 60b and 60c. Corresponding portions of rolls 58 and 60 are oppositely disposed and of the same dimensions. The outer diameters of portions 58a and 60a are lesser than the outer diameters of the portions 58c and 60c in order to accommodate the differences in thickness between the seamed edge of the laminate where only two sheets of insulation are to be bonded and the main body of the laminate where three sheets of insulation and two conducting plates are to be bonded. The outer diameters of portions 58b and 60b are such as to allow free passage of tabs 36 of plates 34 between rolls 58 and 60.

After the laminate has been bonded, tabs 36 are cleaned of any impurities such as dirt, grease or the like by a pair of suitable cleaning means such as brushes 62 and 64 disposed on either side of tabs 36. Two sets of brushes 62 and 64 are provided, one set not being shown, each set 62–64 cleaning the tabs 36 of one plate 34.

Thereafter, the laminated strip may be passed to a suitable slitting device 66 which may, for example, be a knife to cut off excess insulation material from the laminate. The laminated strip may then be passed over idler roll 68 and may be fed to blanking device 70, which may, for example, be a suitable knife mounted on a punching device for severing individual laminated bus assemblies from the laminated strip. Where it is desirable to wind the laminated strip up on a reel (not shown), blanking station 70 may be omitted.

It will be appreciated that the apparatus shown schematically in FIGS. 7–10 is for illustration purposes only, and that any suitable apparatus for performing the functions represented by the various mechanisms shown thereon may be substituted. It will be also appreciated that although a magazine device has been shown to feed individual plates 34 to be laminated, that magazine rack 32 could be eliminated and in its place provision be made for a reel upon which is wound a continuous strip of plate 34, in which case strip 34 could be any length. It will also be appreciated that although plates 34 are shown as having only three tabs, that any number of tabs could be provided on plate 34, either greater or lesser in number.

Referring now to FIGS. 11–13, there is shown in schematic form apparatus for making another laminated bus assembly in accordance with the present invention in which a single conducting plate is insulated by means of a U-shaped strip of insulation material. As shown, a feed device such as magazine rack 72 feeds conducting plates 74 onto a continuous strip of insulating material 76. Insulating material 76 is fed from a reel (not shown). Guide rails 78 hold plate 74 in a vertically disposed position until insulation 76 is folded about it. Idler roll 78 is provided to support strip 76. Insulation 76 is folded about plates 74 by means of obliquely disposed rolls 80, one of which is not shown. These rolls have a function similar to rolls 52 in FIG. 7 and cause insulation material 76 to be gradually folded about plate 74.

Insulation material 76 is coated on its upper side with bonding material such as pressure sensitive adhesive, heat-activated adhesive or the like. After insulation material 76 is folded about plate 74, the laminated strip is passed between a pair of vertically disposed rolls 82, one of which is not shown. Rolls 82 cause insulation material 76 to be sealed along the joined edges thereof to form a seam along only one longitudinal edge of plate 74, and cause insulation material 76 to be bonded to plate 74 in order to produce a laminated bus assembly. As shown, plate 74 is provided with a plurality of tabs 84 which, after lamination, protrude beyond the sealed edge of the laminated bus assembly. A pair of horizontally displaced cleaning devices such as brushes 86 remove any contaminant such as dirt, grease or the like from tabs 84. The laminated strip is then passed to blanking device 88, which severs individual laminated bus assemblies from the strip of laminate. It will be appreciated that where it is desired to provide a series of bus assemblies in a continuous strip, blanking device 88 would be omitted and the laminated strip would be wound up on a suitable reel (not shown).

Figure 6:
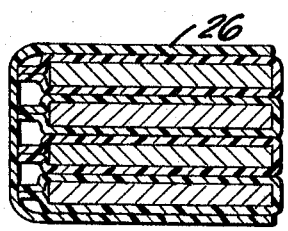
FIG. 6 is a sectional elevational view of another embodiment of the present invention.

In order to form the laminated bus assembly shown in FIG. 6, the apparatus shown in FIGS. 11–13 could be utilized with some modifications. Thus, feed magazine 72 could deposit a plurality of laminated bus assemblies on insulation strip 76. In such a case, guide rails 78 would be spaced an appropriate distance apart to maintain the plurality of insulated laminated bus assemblies in vertical position until insulation strip 76 had been folded about them. In like manner, rolls 80 would be spaced sufficiently far apart to allow passage of the layered assembly therethrough. In order that the laminated bus assemblies be bonded to one another, the surfaces thereof should be coated with a suitable bonding material such as heat-activated adhesive. In like manner, the upper surface of strip 76 should also be coated with a suitable bonding material such as heat-activated adhesive. Rolls 82 would cause bonding of the insulation strip to the outer surfaces of the outer laminated bus assemblies and also cause bonding of the individual bus assemblies to one another.

It will be appreciated that although specific embodiments of the present invention have been described hereinabove and illustrated in the drawings, other embodiments will be readily apparent to those skilled in the art which are considered to be within the scope of this invention. Therefore, the present invention is not to be limited thereby, but rather is to be determined from the following claims.

What is claimed is:

1. A laminated bus assembly comprising at least one conducting plate and a sheet of insulating material folded about said plate and bonded thereto, said folded sheet of insulating material being sealed at its joined edges to form a single bonded seam along only one longitudinal edge of said plate, and said plate having at least one tab protruding externally of said insulating material.

2. The laminated bus assembly of claim 1 wherein said tab is integral with one longitudinal edge of said plate and extends laterally thereto.

3. A laminated bus assembly comprising at least one conducting plate and a sheet of insulating material folded about said plate and bonded thereto, said folded sheet of insulating material being sealed at its joined edges to form a single bonded seam along one longitudinal edge only of said plate, said plate having a plurality of tabs integral with one edge thereof and protruding externally of said insulating sheet.

4. A laminated bus assembly comprising a pair of stacked conducting plates having an inner sheet of insulating material interposed therebetween, and an outer sheet of insulating material folded about said pair of stacked plates and bonded thereto, said folded outer sheet of insulating material being sealed at its joined edges to form a single bonded seam along one longitudinal edge only of said pair of plates, each of said plates having at least one tab perpendicular to the surface thereof protruding through said outer sheet of insulating material.

5. The laminated bus assembly of claim 4 wherein said inner sheet of insulating material is wrapped around one of said plates and extends beyond the edges of said plates.

6. The laminated bus assembly of claim 4 wherein said inner sheet of insulating material and said outer sheet of insulating material are of plastic.

7. A laminated bus assembly comprising a plurality of stacked conducting plates, each of said conducting plates being insulated by a sheet of insulating material folded about said plate and bonded thereto, each of said sheets of insulating material being sealed at its joined edges to form a single bonded seam along only one longitudinal edge of said plate, each of said insulated plates being bonded to adjacent insulated plates, all of said bonded seams of said sheets of insulating material being along the same longitudinal edge of said plurality of stacked plates, and an outer sheet of insulating material folded about said plurality of insulated plates in such manner as to cover said edge of said plates having said bonded seams, said outer sheet of insulating material being bonded to said plurality of stacked insulated conducting plates.

8. The laminated bus assembly of claim 7 wherein said outer sheet of insulating material bonded to said plurality of stacked plates is joined along its edges and sealed to form a single bonded seam at its ends and along the longitudinal edge opposite to said edge of said plurality of stacked plates having said plurality of bonded seams.

References Cited

UNITED STATES PATENTS

| 2,675,421 | 4/1954 | Dexter | 174—117 |
| 2,703,854 | 3/1955 | Eisler | 174—117 |

FOREIGN PATENTS 198,739   6/1923   Great Britain.

LARAMIE E. ASKIN, *Primary Examiner.*

E. GOLDBERG, *Assistant Examiner.*